US007939117B2

(12) United States Patent
Zuccarello et al.

(10) Patent No.: US 7,939,117 B2
(45) Date of Patent: May 10, 2011

(54) RUMINANT FEEDSTOCK DIETARY SUPPLEMENT

(75) Inventors: William J. Zuccarello, Cream Ridge, NJ (US); Elliot Block, Yardley, PA (US); Edward Roman, New Egypt, NJ (US); Zbigniew Sek, Bayonne, NJ (US); Kenneth R. Cummings, Stockton, NJ (US)

(73) Assignee: Church & Dwight Co., Inc., Princeton, NJ (US)

( * ) Notice: Subject to any disclaimer, the term of this patent is extended or adjusted under 35 U.S.C. 154(b) by 1296 days.

(21) Appl. No.: 11/473,880

(22) Filed: Jun. 23, 2006

(65) Prior Publication Data

US 2008/0008779 A1    Jan. 10, 2008

(51) Int. Cl.
*A23K 1/175* (2006.01)
*A23K 1/18* (2006.01)

(52) U.S. Cl. ............. 426/2; 426/302; 426/656; 426/807
(58) Field of Classification Search .................... 426/74, 426/656, 302, 807, 2
See application file for complete search history.

(56) References Cited

U.S. PATENT DOCUMENTS

| | | | | |
|---|---|---|---|---|
| 4,212,890 A | * | 7/1980 | Tiefenbacher et al. | 426/69 |
| 4,384,004 A | | 5/1983 | Cea | |
| 4,595,584 A | * | 6/1986 | Wu et al. | 424/438 |
| 4,842,863 A | | 6/1989 | Nishimura | |
| 4,887,621 A | | 12/1989 | Vallieres | |
| 4,948,589 A | | 8/1990 | Iijima | |
| 4,996,067 A | | 2/1991 | Kobayashi | |
| 5,023,091 A | | 6/1991 | Winowiski | |
| 5,064,665 A | | 11/1991 | Klopfenstein | |
| 5,093,128 A | | 3/1992 | Draguesku | |
| 5,225,238 A | * | 7/1993 | Ardaillon et al. | 427/2.15 |
| 5,227,166 A | * | 7/1993 | Ueda et al. | 424/438 |
| 5,571,527 A | | 11/1996 | Nishimura | |
| 5,585,134 A | * | 12/1996 | Cummings et al. | 426/630 |
| 5,633,004 A | | 5/1997 | Nishimura | |
| 5,635,198 A | | 6/1997 | Nishimura | |
| 5,874,102 A | * | 2/1999 | LaJoie et al. | 424/438 |
| 5,885,610 A | * | 3/1999 | Anderson | 424/438 |
| 6,203,829 B1 | * | 3/2001 | Morikawa et al. | 426/89 |
| 6,306,427 B1 | * | 10/2001 | Annonier et al. | 424/438 |
| 2004/0202695 A1 | * | 10/2004 | Moore | 424/442 |
| 2006/0045957 A1 | | 3/2006 | Bevans et al. | |

FOREIGN PATENT DOCUMENTS

WO    WO-2004/080197 A2    9/2004

OTHER PUBLICATIONS

Canale et al., "Dietary Fat and Ruminally Protected Amino Acids for High Producing Dairy Cows," Journal of Dairy Science, (1990), 135-141, 73, A.D.S.A., Savoy, IL.
Donkin et al., "Rumen-Protect Methionine and Lysine: Effects on Animal Performance, Milk Protein Yield, and . . . ," Journal of D.S., (1989), 1484-1491, 72, A.D.S.A, Savoy, IL.
Polan et al., "Responses of Dairy Cows to Supplemental Rumen-Protected Forms of Methionine and Lysine," Journal of Dairy Science, (1991), 2997-3013, 74, A.D.S.A., Savoy, IL.
Rogers et al., "Plasma Amino Acids and Milk Protein Production by Cows Fed Rumen-Protected Methionine and Lysine," Journal of D.S., (1987), 789-798, 70, A.D.S.A., Savoy, IL.
Rogers et al., "Production Responses of Dairy Cows Fed Various Amounts of Rumen-Protected Methionine and Lysine," Journal of D.S., (1989), 1800-1817, 72, A.D.S.A., Savoy, IL.

* cited by examiner

*Primary Examiner* — C. Sayala
(74) *Attorney, Agent, or Firm* — Frenkel & Associates, P.C.; Stephen B. Shear

(57) ABSTRACT

This invention provides a rumen-bypass dietary supplement in compacted particulate form. The supplement has the capability to transport fatty acid calcium salt and between about 65-96 percent of rumen-protected undegraded aminoacid content to the post-ruminal digestive system of a ruminant. A feedstock containing the supplement for ruminants beneficially improves feed efficiency and body growth. The feedstock also is adapted to improve the lactational performance of dairy cattle.

23 Claims, No Drawings

RUMINANT FEEDSTOCK DIETARY SUPPLEMENT

BACKGROUND OF THE INVENTION

This invention generally relates to ruminant feedstocks which are supplemented with a rumen-bypass protected biologically active content. More specifically in preferred embodiments this invention relates to feedstocks for domesticated ruminants which are capable of delivering undegraded essential aminoacids such as lysine and methionine to the post-rumen digestive system of ruminants such as dairy cattle.

Publications cited in the present specification are incorporated by reference.

When a feedstock for ruminants has a content of biologically active constituent, a substantial amount of the said constituent (e.g., protein, aminoacids, and the like) is degraded to ammonia or carbon dioxide gas by microorganisms in the rumen. This prevents effective utilization of the administered biologically active constituent in the feedstock.

When special nutrients or medicaments are administered to ruminants, it is essential to protect these ingredients from decomposition in the rumen. The objective is to pass the said ingredients through the rumen to the omasum, and subsequently to the abomasum and absorption by the small intestine.

There are ongoing research and development activities which are seeking to achieve ruminant feedstock supplements which have the desired rumen-bypass properties. Rumen-bypass formulations are reported in numerous publications such as U.S. Pat. Nos. 4,842,863; 4,948,589; 5,023,091; 5,064,665; 5,093,128; 5,571,527; 5,633,004; 5,635,198; 6,203,829 and 6,306,427. There is further disclosure in WO2004/080197-A2 (PCT) and references cited therein.

Special effort has been directed to achieving rumen-bypass protection for essential aminoacids which supplement feedstocks for milk-producing ruminants.

It is known that lysine and methionine are important for milk production in dairy cattle. Journal of Dairy Science, 70, 789 (1987) reports that rumen-protected lysine increased feed intake, milk yield and 4% fat-corrected milk production in dairy cows. Rumen-protected methionine and lysine increased production of milk protein in dairy cows.

Similar results are reported in Journal of Dairy Science, 72, 1484 (1989); 72, 1800 (1989); 73, 135 (1990); and 74, 2997 (1991). Data also indicated that added fat increased the percentage and yield of long-chain fatty acids in cow milk. Adding ruminally-protected aminoacids to fat-supplemented diets appeared to alleviate the milk protein depression observed with added lipids in feedstock.

Because of the significant economic consequences of rumen-bypass undegraded dietary nutrient transport, there is continuing interest in the development of superior rumen-bypass feedstock supplements to promote these prospective advantages.

Accordingly, it is an object of this invention to provide ruminant feedstocks which are supplemented with a rumen-protected biologically active content for advancing ruminant husbandry and for providing value added meat and dairy products for human consumption.

It is another object of this invention to provide rumen-bypass dietary supplements to stabilize and maintain the health of ruminants, and to improve the lactational performances of dairy ruminants.

It is yet another object of this invention to provide rumen-bypass dietary supplements which deliver post-rumen undegraded aminoacids in milk-producing dairy cattle for increased milk yield and increased production of milk protein.

It is a further object of this invention to provide an efficient process for producing a rumen-bypass dietary supplement in compacted particulate form, which supplement has the capability of passing between about 40-96 percent of its rumen-protected biologically active content to the post-rumen digestive system of ruminants.

Other objects and advantages of the present invention shall become apparent from the accompanying description and example data.

DESCRIPTION OF THE INVENTION

One or more objects of the present invention are accomplished by the provision of a rumen-bypass dietary supplement in compacted particulate form comprising:

(a) $C_{12}$-$C_{22}$ fatty acid alkaline earth metal salt;
(b) between about 5-40 weight percent of aminoacid;
(c) between about 2-10 weight percent of carboxylate salt-forming $C_{12}$-$C_{22}$ fatty acid constituent; and
(d) between about 0.5-15 weight percent of inorganic alkaline earth metal compound; wherein the supplement particles have average dimensions between about 2-5 millimeters, and a density between about 1-1.3 grams per cubic centimeter; and wherein under ruminant feeding conditions the said supplement has the capability to transport between 40-96 percent of rumen-protected undegraded aminoacid content to the post-rumen digestive system of a ruminant.

Standard procedures and equipment are employed to blend ingredients and apply coatings as appropriate. Granules or pellets are coated by conventional means such as pan coating, fluidized coating, centrifugal fluidized coating, and the like.

A present invention dietary supplement can be in the form of spherical, elliptical or cylindrical pellets which are in compacted form. Production of compressed solids can be facilitated with commercially available pellet mills and extruders, supplied by companies such as Sprout-Matador (Muncy, Pa.) and Roskamp Champion (Waterloo, Iowa).

In a preferred embodiment this invention provides a rumen-bypass dietary supplement in compacted particulate form comprising:

(a) $C_{12}$-$C_{22}$ fatty acid calcium and/or magnesium salt;
(b) between about 5-40 weight percent of aminoacid;
(c) between 2-10 weight percent of calcium and/or magnesium carboxylate salt-forming liquid $C_{12}$-$C_{22}$ fatty acid constituent; and
(d) between about 0.5-15 weight percent of basic calcium and/or magnesium hydroxide and/or oxide and/or phosphate and/or carbonate; wherein the supplement particles have average dimensions between about 2-5 millimeters, and a density between about 1-1.3 grams per cubic centimeter; and wherein under ruminant feeding conditions the said supplement has the capability to transport between about 65-96 percent of rumen-protected undegraded aminoacid content to the post-rumen digestive system of a ruminant.

The central core of a typical dietary supplement particle (e.g., in pellet form) comprises a blend of aminoacid and fatty acid calcium and/or magnesium salt. An essential procedure in the practice of the present invention is the application of a liquid fatty acid coating to the said central core pellet surface, and the separate application of a basic inorganic reagent such as calcium hydroxide to the same central core surface. Either coating can be applied first. The super-imposed coatings constitute a reactive matrix, and in situ the matrix transforms into an interlocking network of polyvalent fatty acid salts. The resultant periphery of the pellet structure is a bonded hard lamina which imparts superior rumen-bypass properties to an invention dietary supplement for incorporation in ruminant feedstocks.

As an optional modification, the hereinabove described rumen-protected dietary supplement particles then can be encapsulated with an outer coating for additional rumen-bypass capability. Suitable coating substrates include waxes and polymers which can form a continuous film that functions as an impermeable barrier to a ruminal medium. This type of coating subsequently is capable of being disintegrated in the strongly acidic condition of the gastric fluid in the abomasum of ruminants.

Useful coating materials include camauba wax, beeswax, polyvinylpyrrolidone, polyacrylamide, poly(styrene/2-vinylpyridine), polyvinyl acetate, shellac, zein, benzylaminomethylcellulose, ethylcellulose, cellulose acetate, and the like, and coating materials disclosed in U.S. Pat. Nos. 4,194,013; 4,384,004; 4,887,621; and 4,996,067.

Referring now to specific molecular aspects of the dietary supplement ingredients, the designation "$C_{12}$-$C_{22}$ fatty acid" is exemplified by a mixture comprising 0-10 percent lauric acid, 0-60 percent palmitic acid, 0-10 percent stearic acid, 0-60 percent oleic acid and 0-10 percent linoleic acid.

A present invention dietary supplement permits a beneficial increase in the post-rumen digestive system absorption of $C_{12}$-$C_{22}$ fatty acids. This concentrated energy source of lipids in feedstocks for lactating dairy cattle generates increased milk yields without draining their reserves of body fat and without diminishing the proportion of milk fat in the milk produced.

Because $C_{12}$-$C_{22}$ fatty acids are susceptive to atmospheric oxidation, it is advantageous to incorporate an oil-soluble antioxidant such as butylated hydroxytoluene or 6-ethoxy-1,2-dihydro-2,2,4-trimethylquinoline.

With respect to the aminoacid component of an invention dietary supplement, the essential aminoacids are of special interest. Preferred aminoacids include alanine, glycine, lysine, methionine, methionine hydroxy analog, tryptophan, arginine, threonine, valine, leucine, isoleucine, histidine, phenylalanine, glutamine and glutamic acid.

For lactating dairy cattle feedstocks, the most valuable present invention dietary supplements are those that deliver high levels of post-rumen contents of $C_{12}$-$C_{22}$ fatty acids and one or more of lysine, methionine, methionine hydroxy analog and tryptophan.

A dietary supplement of the present invention can have a varied combination of biologically active ingredients, such as aminoacid and/or between about 0.1-30 weight percent of one or more active ingredients selected from vitamins, trace elements, proteins, non-protein nitrogen compounds, medicaments, enzymes, and the like.

Vitamins either singly or in combination include thiamine HCl, riboflavin, pyridoxine HCl, niacin, biotin, folic acid, ascorbic acid, vitamin $B_{12}$, vitamin A acetate, vitamin K, vitamin D, vitamin E, and the like.

Trace elements include compounds of cobalt, copper, manganese, iron, zinc, tin, iodine, vanadium, selenium, and the like.

Protein ingredients are obtained from sources such as dried blood or meat meal, cottonseed meal, soy meal, dehydrated alfalfa, dried and sterilized animal and poultry manure, fish meal, powdered eggs, canola meal, and the like.

Protein equivalent ingredients include urea, biuret, ammonium phosphate, and the like.

Medicament ingredients either singly or in combination include promazine hydrochloride, chlorotetracycline, sulfamethazine, monensin, poloxalene, and the like. Oxytetracycline is a preferred antibiotic for cattle prophylaxis.

Enzymes of choice include lipolytic proteins which aid feed digestability, e.g., by hydrolysis of fatty acid glycerides to free fatty acid and glycerol.

Another aspect of the present invention is the provision of ruminant feedstocks, with particular reference to a feedstock for improving the lactational performance of dairy cattle. This type of feedstock typically comprises a basal ration having a prescribed beneficial content of a rumen-bypass dietary supplement in accordance with the present invention.

A feedstock for ruminants such as lactating cattle normally will include silage, and energy concentrate and protein concentrate of the following types:

| Energy Concentrate | % |
| --- | --- |
| Ground shelled corn | 56.87 |
| Ground ear corn | 34.50 |
| Molasses | 2.00 |
| Animal/vegetable fat | 1.00 |
| Minerals and vitamins | 5.63 |

| Protein Concentrate | % |
| --- | --- |
| Soybean meal - 44% | 60.88 |
| Soybean hulls | 26.20 |
| Molasses | 1.00 |
| Fish meal | 3.90 |
| Animal/vegetable fat | 1.00 |
| Sodium bicarbonate | 3.90 |
| Magnesium oxide | 0.92 |

In a feeding regimen for lactating dairy cattle, it is preferred that the total lipid content of a feedstock comprises at least 40 molar percent of unsaturated 18-carbon fatty acid constituents, so that the recovered milk product has increased nutritive and health values for human consumption.

It is known that a fatty acid such as conjugated linoleic acid (CLA) has potential anticarcinogenic activity. This CLA isomer of linoleic acid mainly is formed as a product of ruminal biohydrogenation.

It is also known that increasing the consumption of omega-3 unsaturated fatty acids has human health benefits, particularly with alpha-linolenic acid and docosahexaenoic acid (DHA). Omega-3 unsaturated fatty acids have been shown to reduce hypertension and to lower serum lipids. These omega-3 fatty acid species also are recognized as important dietary agents for preventing heart disease and alleviating inflammatory conditions, and for retarding the growth of tumor cells.

As illustrated in the Examples, this invention further provides a process for producing the range of rumen-bypass dietary supplements described hereinabove.

The said process involves a procedure which comprises (1) blending $C_{12}$-$C_{22}$ fatty acid alkaline earth metal salt and between about 5-40 weight percent of biologically active ingredients to form solid central core particles; (2) compacting the core particles to form pellets; (3) coating the pellets with between about 2-10 weight percent of liquid carboxylate salt-forming $C_{12}$-$C_{22}$ fatty acid constituent; and (4) applying an additional coating to the pellets with a constituent comprising between about 0.5-15 weight percent of basic inorganic alkaline earth metal compound to create an in situ reactive carboxylate salt-forming matrix; wherein the supplement pellets have average dimensions between about 2-5 millimeters and a density between about 1-1.3 grams per cubic centimeter.

A volume of core particles as described can be compacted into pellets by conventional means such as extrusion.

In the invention process elaborated above, either of the coatings can be the first applied to the pellets, or pre-mixed before application. As an optional step, the pellets then can be encapsulated with a final outer coating of wax or polymeric material to form an impermeable barrier to a ruminal fluid.

Pellets formed by compressing granules of invention dietary supplement typically have an outer surface area between about 2.97-1270 square millimeters. The pellets have a hardness value between about 2-10 kiloponds (Kp), as measured in the x-length axis direction and in the y-diameter axis direction. Hardness values can be determined employing commercial equipment such as Tablet Hardness Tester, Model H-T-300 distributed by Key International, Inc., Englishtown, N.J.

The following Examples are further illustrative of the present invention. The components and specific ingredients are presented as being typical, and various modifications can be derived in view of the foregoing disclosure within the scope of the invention.

In the Examples, pellets from each formulation are weighed and incorporated in mesh dacron containers and inserted in the rumen of mature cows. The quantities of formulation aminoacid remaining in the dacron bags are measured after three-hour and twelve-hour durations.

EXAMPLE I

In a one cubic foot ribbon blender, 4 pounds of $C_{12}$-$C_{22}$ fatty acid calcium salts (MEGALAC, Church & Dwight Co., Princeton, N.J.) having a particle size less than 40 U.S. Mesh, and one pound of —60 U.S. Mesh lysine monohydrochloride, are treated with 0.15 pound of ethanol and blended for a period of five minutes.

The resulting core formulation I is discharged from the ribbon blender, and then charged to the feed hopper of a Model 060 Acrison feeder. The mixture is fed continuously to a CPM Pellet Mill Model CL-3 equipped with a 5 inch I.D. 3/16 inch pellet diameter×1 inch wide×1 inch thick die at the rate of 1.5 pounds per minute. Die temperature is maintained between about 90°-95° F. The resulting formulation I pellets are collected, and then screened to remove fragments less than 1/8×1/8 inch, blown with compressed air to remove dust, and cooled.

Formulation I pellets produced in this manner have a dacron in-sacco rumen-bypass retention of 70% after three hours, and a retention of 47% after twelve hours.

The treatment of the initial fatty acid salt/aminoacid mixture with a liquid solvent such as ethanol, isopropanol, THF or dimethylformamide improves the rumen-bypass capability of formulation I pellets. The solvent evaporates during the extrusion process, and the remaining blend has an enhanced internal cohesiveness.

EXAMPLE II

A half-pound of the core formulation I pellets are placed in a 12-inch diameter coating pan rotating at 15 RPM, and 2 grams of calcium hydroxide are added. The pellets are tumbled for several minutes until they are uniformly coated with the calcium hydroxide. Then 9.4 grams of palm fatty acid distillate (PFAD) at a temperature of 80° C. are sprayed on to the calcium hydroxide-coated pellets to form a fatty acid carboxylate salt-forming reactive matrix on the pellet surfaces. Optionally, the PFAD can be sprayed on the pellets before the calcium hydroxide treatment.

The carboxylate salt formation in the reactive matrix is allowed to proceed for a period of about 15 minutes, and then one gram of Degussa D-17 hydrophobic silica is added to provide separated formulation II pellets.

Coated pellets produced in this manner have a dacron in-sacco rumen-bypass retention of 92% after three hours, and a retention of 76% after twelve hours.

Over a series of runs, the pellets have a hardness value between about 2-10 Kiloponds (Kp), with an average value of 6 Kiloponds (Kp).

EXAMPLE III

Formulation II pellets are prepared as described in Example II.

One half pound of the pellets are charged to a rotating pan and dusted with 12 grams of ball-milled paraffin wax (m.p. 73°-80° C.; Sigma-Aldrich Co.) to form a uniform coating on the pellet surfaces, and then the pellets are treated with hot air to soften and spread the wax coating. After cooling, one gram of Degussa D-17 hydrophobic silica is added to separate the formulation III pellets.

Wax-coated formulation III pellets produced in this manner have a dacron in-sacco rumen-bypass retention of 97% after three hours, and a retention of 83% after twelve hours.

Similar results are obtained with formulations I-III if other biologically active ingredients are employed together with or instead of the aminoacid, such as vitamins, trace elements, proteins, non-protein nitrogen compounds, medicaments and enzymes.

What is claimed is:

1. A rumen-bypass dietary supplement in compacted particulate form comprising:
    A) a central core comprising a blend of:
        (a) $C_{12}$-$C_{22}$ fatty acid alkaline earth metal salt; and
        (b) between about 5-40 weight percent of aminoacid; and
    B) two coatings forming a reactive matrix on said central core, said coatings comprising;
        (c) between about 2-10 weight percent of carboxylate salt-forming $C_{12}$-$C_{22}$ fatty acid constituent; and
        (d) between about 0.5-15 weight percent of inorganic alkaline earth metal compound and said coatings in situ yields an alkaline earth metal carboxylate surrounding said central core;
    wherein the supplement particles have average dimensions between about 2-5 millimeters, and a density between about 1-1.3 grams per cubic centimeter; wherein under ruminant feeding conditions said dietary supplement has the capability to transport between about 40-96 percent of rumen-protected undegraded aminoacid content to the post-rumen digestive system of a ruminant.

2. A dietary supplement in accordance with claim 1 wherein the supplement particles are rumen-bypass protected with an additional coating which forms an impermeable barrier to a ruminal medium.

3. A dietary supplement in accordance with claim 1 wherein the aminoacid ingredient is an alkaline earth metal salt.

4. A dietary supplement in accordance with claim 1 wherein either of said coatings (c) and (d) can be the first applied to said central core to form said reactive matrix.

5. A dietary supplement in accordance with claim 1 wherein said alkaline earth metal compound is basic calcium and/or magnesium hydroxide and/or oxide and/or phosphate and/or carbonate.

6. A dietary supplement in accordance with claim 1 wherein the compacted particles are spherical, elliptical or cylindrical in shape.

7. A dietary supplement in accordance with claim 1 wherein the compacted particles have an outer surface area between about 2.97-1270 square millimeters.

8. A dietary supplement in accordance with claim 1 wherein the compacted particles have a hardness value between about 2-10 Kiloponds (Kp).

9. A rumen-bypass dietary supplement in compacted particulate form comprising:
A) a central core comprising a blend of:
  (a) $C_{12}$-$C_{22}$ fatty acid calcium and/or magnesium salt; and
  (b) between about 5-40 weight percent of aminoacid;
B) two coatings forming a reactive matrix on said central core, said coatings comprising
  (c) between about 2-10 weight percent of calcium and/or magnesium carboxylate salt-forming liquid $C_{12}$-$C_{22}$ fatty acid constituent; and
  (d) between about 0.5-15 weight percent of basic calcium and/or magnesium hydroxide and/or oxide and/or phosphate and/or carbonate; and said coatings in situ yields an alkaline earth metal carboxylate surrounding said central core;
  wherein the supplement particles have average dimensions between about 2-5 millimeters; and a density between about 1-1.3 grams per cubic centimeters; wherein under ruminant feeding conditions said dietary supplement has the capability to transport between about 65-96 percent of rumen-protected undegraded aminoacid content to the post-rumen digestive system of a ruminant.

10. A dietary supplement in accordance with claim 9, wherein the supplement particles are pellets that are rumen-bypass protected with an additional coating, which forms an impermeable barrier to a ruminal medium.

11. A dietary supplement in accordance with claim 9 wherein either of said coatings (c) and (d) can be the first applied to said central core to form said reactive matrix.

12. A dietary supplement in accordance with claim 9 wherein the $C_{12}$-$C_{22}$ fatty acid moiety in said ingredients is a mixture comprising 0-10 percent lauric acid, 0-60 percent palmitic acid, 0-10 percent stearic acid, 0-60 percent oleic acid and 0-10 percent linoleic acid.

13. A dietary supplement in accordance with claim 9 wherein the aminoacid ingredient is selected from essential aminoacids.

14. A dietary supplement in accordance with claim 9 wherein the aminoacid ingredient is selected from alanine, glycine, lysine, methionine, methionine hydroxy analog, tryptophan, arginine, threonine, valine, leucine, isoleucine, histidine, phenylalanine, glutamine and glutamic acid.

15. A dietary supplement in accordance with claim 9 wherein the aminoacid ingredient is selected from lysine, methionine, methionine hydroxy analog and tryptophan.

16. A dietary supplement in accordance with claim 9 wherein said aminoacid and/or between about 0.1-30 weight percent of one or more biologically active ingredients are homogeneously incorporated.

17. A dietary supplement in accordance with claim 16 wherein said one or more biologically active ingredients are selected from vitamins, trace elements, proteins, non-protein nitrogen compounds, medicaments and enzymes.

18. A feedstock for improving the lactational performance of dairy cattle, comprsing a basal ration having a prescribed beneficial content of a rumen-bypass dietary supplement in accordance with claim 1.

19. A feedstock for improving the lactational performance of dairy cattle, comprising a basal ration having a prescribed beneficial content of a rumen-bypass dietary supplement in accordance with claim 9.

20. A process for producing a rumen-bypass dietary supplement in compacted pellet form comprising:
(1) blending $C_{12}$-$C_{22}$ fatty acid alkaline earth metal salt and between about 5-40 weight percent of biologically active ingredient to form solid central core particles;
(2) compacting said core particles to form pellets;
(3) coating said pellets with between about 2-10 weight percent of liquid carboxylate salt-forming $C_{12}$-$C_{22}$ fatty acid constituent; and
(4) applying an additional coating to the pellets with a constituent comprising between about 0.5-15 weight percent of basic inorganic alkaline earth metal compound to create an in situ reactive carboxylate salt-forming matrix;
wherein the supplement pellets have average dimensions between about 2-5 millimeters, and a density between about 1-1.3 grams per cubic centimeter.

21. A process in accordance with claim 20 wherein either coating step 3 or step 4 is applied first.

22. A process in accordance with claim 20 wherein the dietary supplement pellets are encapsulated with an additional coating selected from waxes and polymers, which forms an impermeable barrier to a ruminal medium.

23. A process in accordance with claim 20 wherein said biologically active ingredient comprises aminoacid.

* * * * *